(12) United States Patent
Estrem et al.

(10) Patent No.: US 8,863,035 B2
(45) Date of Patent: Oct. 14, 2014

(54) DYNAMIC SELF-REORGANIZING TREES IN A USER INTERFACE

(71) Applicant: International Business Machines Corporation, Armonk, NY (US)

(72) Inventors: Michael E. Estrem, Hillsborough, NC (US); Andrew J. Ivory, Wake Forest, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/661,091

(22) Filed: Oct. 26, 2012

(65) Prior Publication Data

US 2014/0123074 A1    May 1, 2014

(51) Int. Cl.
    *G06F 3/048*      (2013.01)

(52) U.S. Cl.
    USPC ............................ 715/853; 715/854; 715/855

(58) Field of Classification Search
    None
    See application file for complete search history.

(56) References Cited

U.S. PATENT DOCUMENTS

| | | | | |
|---|---|---|---|---|
| 6,519,617 | B1 * | 2/2003 | Wanderski et al. | 715/235 |
| 7,392,483 | B2 * | 6/2008 | Wong et al. | 715/746 |
| 7,484,185 | B2 * | 1/2009 | Farrington et al. | 715/860 |
| 7,636,886 | B2 * | 12/2009 | Wyle et al. | 715/277 |
| 7,769,794 | B2 * | 8/2010 | Moore et al. | 707/831 |
| 7,792,817 | B2 * | 9/2010 | Shan et al. | 707/709 |
| 7,823,087 | B2 | 10/2010 | Nan et al. | |
| 7,908,550 | B1 * | 3/2011 | Chittu et al. | 715/234 |
| 2004/0169688 | A1 * | 9/2004 | Burdick et al. | 345/854 |
| 2006/0059441 | A1 * | 3/2006 | Todd | 715/853 |
| 2008/0086703 | A1 | 4/2008 | Flynt et al. | |
| 2009/0164947 | A1 | 6/2009 | Taylor et al. | |
| 2011/0219324 | A1 | 9/2011 | Watanabe et al. | |

* cited by examiner

*Primary Examiner* — Ryan Pitaro
*Assistant Examiner* — Daniel Samwel
(74) *Attorney, Agent, or Firm* — Jordan IP Law, LLC

(57) ABSTRACT

Methods and systems may provide for receiving a display request associated with a parent node of a hierarchical tree, wherein the parent node has a plurality of child nodes. Additionally, a graphical representation of the parent node and the plurality of child nodes may be determined based on a plurality of factors, and a display response can be generated based on the graphical representation. In one example, the display request is received from a browser and the plurality of factors include a browser type associated with the browser.

20 Claims, 3 Drawing Sheets

DYNAMIC SELF-REORGANIZING TREES IN A USER INTERFACE

BACKGROUND

Embodiments of the present invention generally relate to displaying tree representations of data such as file structures. More particularly, embodiments relate to the deployment of dynamic self-reorganizing tree representations in user interfaces.

Presenting a user with a hierarchical tree representation of a file structure can pose some unique challenges, especially if the tree is large and fairly flat (e.g., each parent node in the tree has many child nodes). These challenges may be even more acute if the presentation occurs in a browser. For example, presenting the tree in a visually appealing and manageable way may be quite difficult in web based settings, given that different browsers can be capable of rendering different amounts of information at different speeds.

BRIEF SUMMARY

Embodiments may include a computer program product having a computer readable storage medium and computer usable code stored on the computer readable storage medium. If executed by a processor, the computer usable code may cause a computer to receive a display request associated with a parent node of a hierarchical tree, wherein the parent node is to have a plurality of child nodes. The computer usable code, if executed, may also cause a computer to determine a graphical representation of the parent node and the plurality of child nodes based on a plurality of factors, and generate a display response based on the graphical representation.

Embodiments may also include a computer implemented method in which a display request is received from a browser, wherein the display request is associated with a parent node of a hierarchical tree and the parent node has a plurality of child nodes. The method may also provide for repackaging a default structure of the hierarchical tree based on a plurality of factors to determine a graphical representation of the parent node and the plurality of child nodes. The plurality of factors can include one or more of a browser type associated with the browser, an available memory of a client device associated with the display request, a render latency associated with a previously displayed node of the hierarchical tree, a client device type, a display resolution, a display area, a page resize configuration and a number of child nodes. Additionally, the method may involve generating a display response based on the graphical representation and sending the display response to the browser.

Embodiments may also include a computer program product having a computer readable storage medium and computer usable code stored on the computer readable storage medium. If executed by a processor, the computer usable code may cause a first device to receive a display request from a browser, wherein the display request is to be associated with a parent node of a hierarchical tree and the parent node is to have a plurality of child nodes. The computer usable code, if executed, may also cause a computer to repackage a default structure of the hierarchical tree based on a plurality of factors to determine a graphical representation of the parent node and the plurality of child nodes. The plurality of factors may include one or more of a browser type associated with the browser, an available memory of a client device associated with the display request, a render latency associated with a previously displayed node of the hierarchical tree, a client device type, a display resolution, a display area, a page resize configuration and a number of child nodes. The computer usable code, if executed, may also cause a computer to generate a display response based on the graphical representation and send the display response to the browser.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
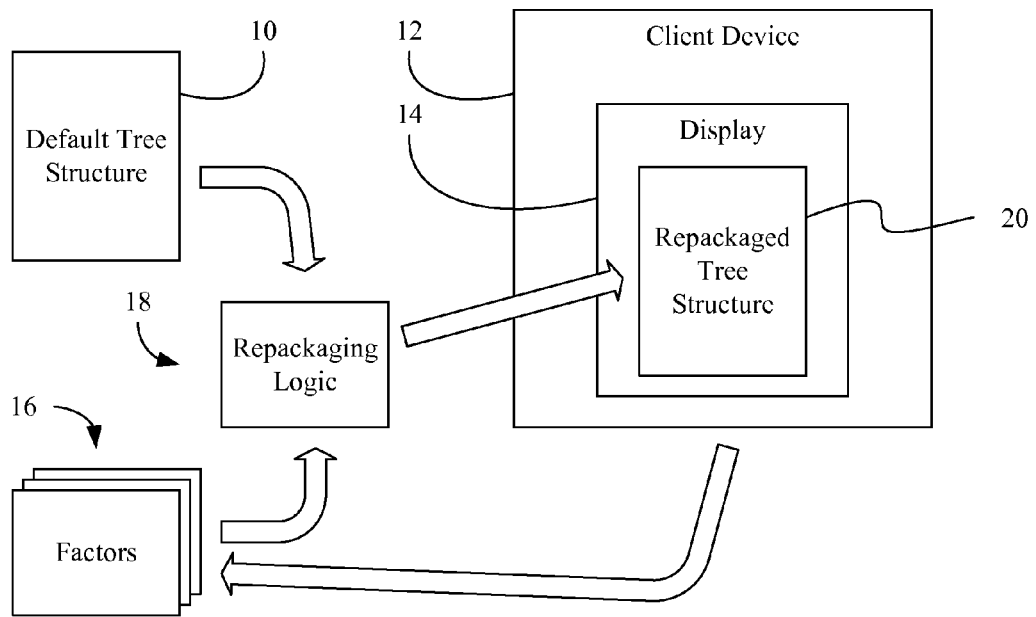
FIG. 1 is a block diagram of an example of a scheme to repackage tree structures according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme to repackage a default tree structure 10 is shown. In the illustrated example, a client device 12 such as a desktop computer, notebook computer, smart tablet, smart phone, personal digital assistant (PDA), etc., includes a display 14 having an area to present data such as a file structure in a hierarchical tree, wherein the tree has the default tree structure 10. The display area may correspond to, for example, a browser window shown on the display 14, wherein the display configurations and capabilities of the browser window may vary from device to device. For example, the browser of the illustrated client device 12 might be a desktop computer browser that supports the display of relatively large amounts of tree data, whereas another client device (not shown) could be an embedded smart phone browser that supports the display of relatively small amounts of tree data. Other concerns that impact the display of the tree may also vary from device to device. Indeed, these other concerns can change from moment to moment depending upon current usage conditions.

Accordingly, the illustrated scheme includes repackaging logic 18 that uses a plurality of factors 16 to dynamically adapt the default tree structure 10 into a repackaged tree structure 20. As will be discussed in greater detail, the factors 16 can enable the repackaged tree structure 20 to be tailored to the client device 12, the underlying data and real-time usage conditions, wherein the illustrated scheme can be particularly advantageous for trees that are relatively large and flat.

Figure 2:
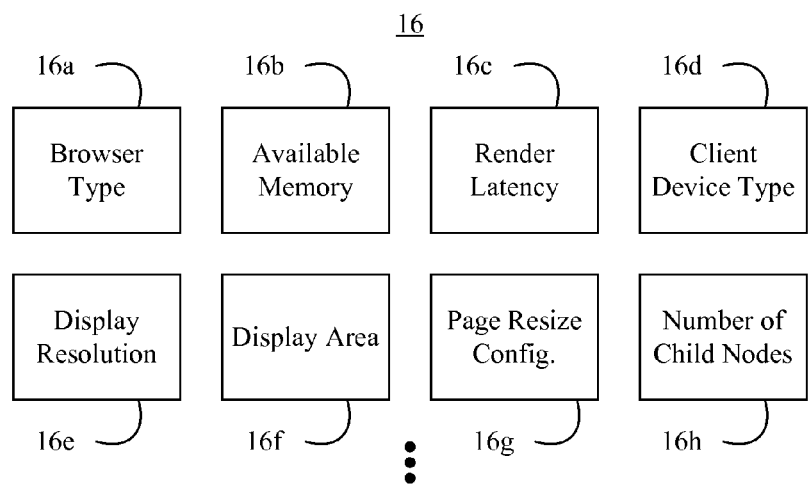
FIG. 2 is a block diagram of an example of a plurality of factors according to an embodiment.

FIG. 2 shows one example of a plurality of factors 16 (16a-16h) that might be used to repackage tree structures. In the illustrated example, browser type 16a, available memory 16b of the client device, render latency 16c, client device type 16d, display resolution 16e, display area 16f, page resize configuration 16g, number of child nodes 16h, and so forth, may all be considered when repackaging the default structure of the hierarchical tree. As a result, a much more dynamic and adaptable solution can be obtained, wherein the tree can effectively "self-reorganize" prior to display on a wide variety of display devices in a wide variety of settings.

Figure 3:
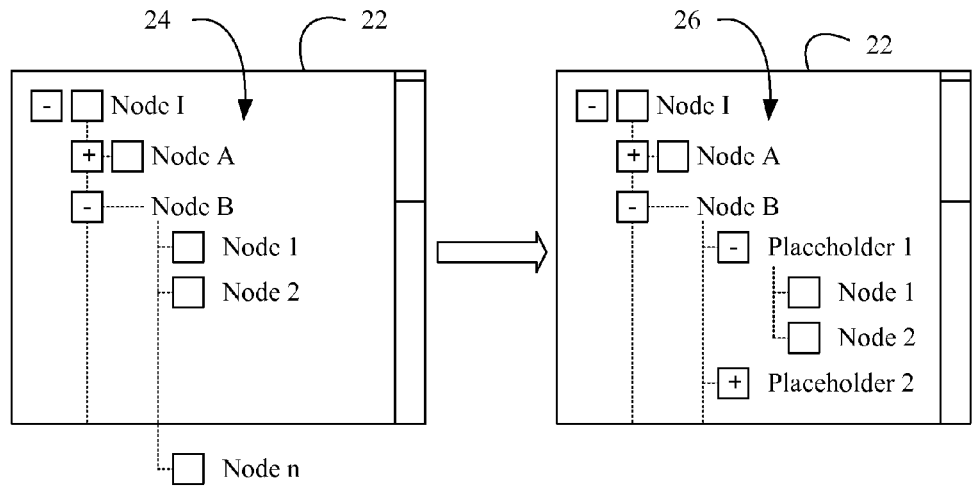
FIG. 3 is an illustration of an example of a repackaged tree structure according to an embodiment.

Turning now to FIG. 3, one example of a tree structure repacking is shown. In the illustrated example, a hierarchical tree to be presented in a display area 22 includes a default structure 24 that has a parent node ("Node B") with a large number of child nodes ("Node 1" to "Node n", where "n" is large). As a result, expanding Node B may cause a large amount of delay under the default structure 24. Indeed, certain applications may involve default structures with thousands of child nodes and HTML (Hypertext Markup Language) pages that are 10+ Mb in size, wherein expanding nodes may lead to significant delays and potential browser freezes while the tree is being processed by the browser for display. Thus, the illustrated approach recognizes the potential delay presented by the default structure 24, generates a plurality of subgroup placeholders ("Placeholder 1", "Placeholder 2", etc.), and organizes the child nodes into the subgroup placeholders to form a repackaged structure 26. Repackaging the default structure 24 may also involve automatically minimizing one or more other nodes in the hierarchical tree to accommodate the display of the graphical representation of the parent node and the child nodes.

Of particular note is that the repackaged structure 26 presents the underlying data in a visually appealing and manageable way, and does not suffer from unacceptable delays, in the illustrated example. Moreover, the illustrated repackaging is only temporary and need not change the default structure 24 (e.g., for future displays by the same or other client device). Other repackaging solutions may also be used. Additionally, repackaging may be toggled on or off by the user.

Figure 4:
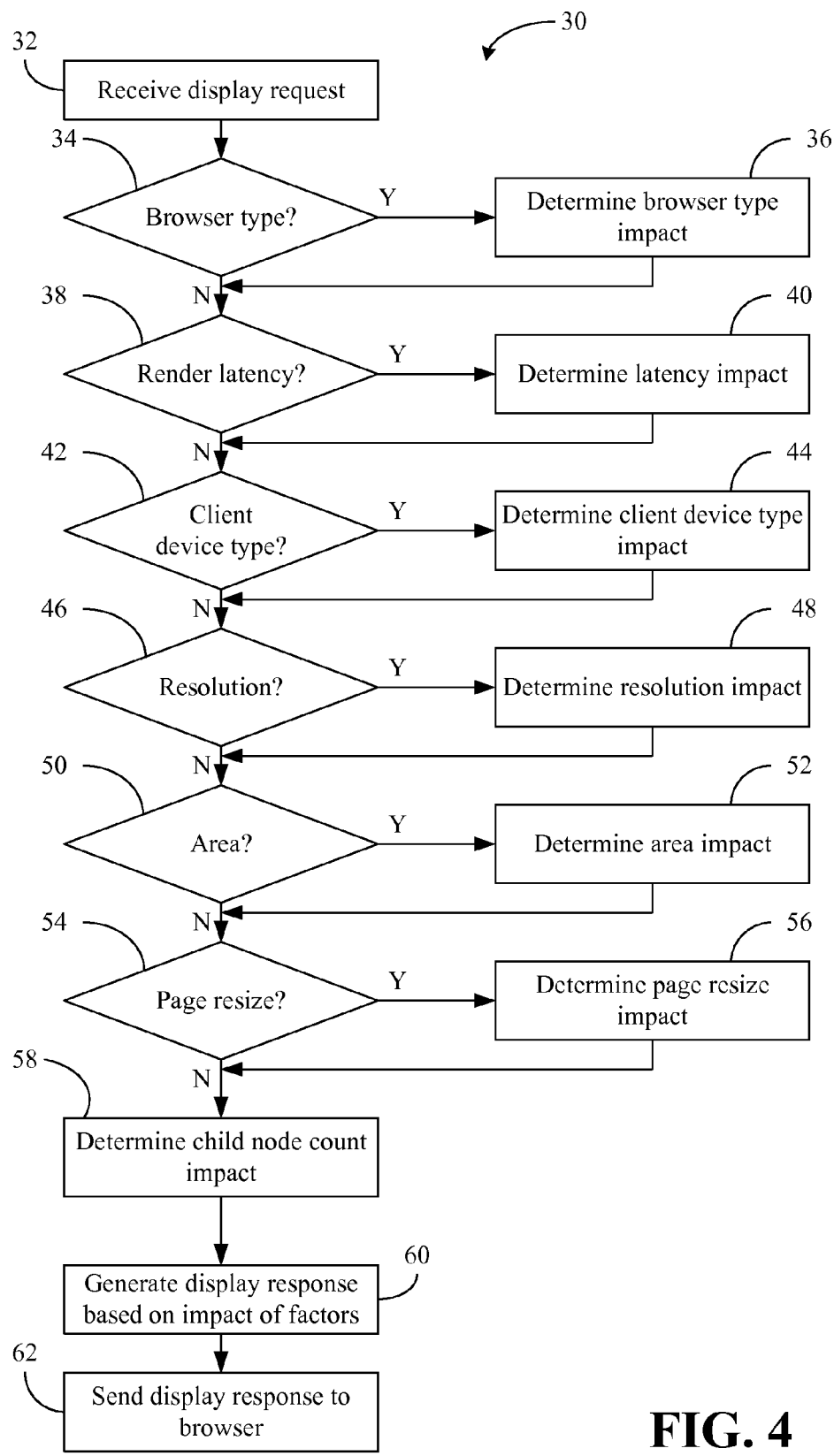
FIG. 4 is a flowchart of an example of a method of repackaging a tree structure according to an embodiment.

FIG. 4 shows a method 30 of repackaging a tree structure. The method 30 may be implemented as repackaging logic such as the repackaging logic 18 (FIG. 1) in, for example, a web server, a network component, a client device, or any combination thereof. Illustrated processing block 32 provides for receiving a display request. In one example, the display request is received from a browser. The display request might correspond to, for example, a user selecting a plus sign to the left of the "Node B" parent node in the default structure 24 (FIG. 3), already discussed, in order to expand that node and view its child nodes. The display request may also correspond to a bookmark selection by the user. In this regard, bookmarks may be used to speed up node selection and display, which can be particularly advantageous in situations where nodes have a variable position within the default structure (e.g., one or more of the child nodes may change locations in the tree).

A determination may be made at block 34 as to whether the browser type associated with the browser is known, wherein the browser type may be obtained from header information and/or other metadata in the display request. If so, illustrated block 36 determines the impact of the browser type on the display and/or processing of the requested data (e.g., parent node and child nodes). For example, it may be determined that the type of browser in use may be capable of rendering small amounts of information at only low speeds. Another type of browser, on the other hand, might be capable of rendering large amounts of information at high speeds.

A determination may be made at block 38 as to whether the render latency associated with a previously displayed node is known, wherein the render latency may obtained from the display request, timing information associated with previous requests (e.g., responses and acknowledgements), and so forth. If the render latency is known, illustrated block 40 determines the impact of the render latency on the display and/or processing of the requested data. Additionally, a determination may be made at block 42 as to whether the type of client device is known, wherein the client device type may be obtained from the display request or other information source. If so, illustrated block 44 determines the impact of the client device type on the display and/or processing of the requested data. For example, certain types of client devices might have less processing capability than others.

A determination may be made at block 46 as to whether the display resolution is known, wherein the display resolution might be obtained from the display request or other information source. If so, illustrated block 48 determines the impact of the display resolution on the display and/or processing of the requested data. For example, higher resolution displays may support the display of more information than lower resolution displays. Additionally, a determination may be made at block 50 as to whether the display area is known, wherein the display area may be obtained from the display request or other information source. If so, illustrated block 52 determines the impact of the display area on the display and/or processing of the requested data.

A determination may be made at block 54 as to whether a page resize configuration is known, wherein page resizes can cause a change in the available display area. The page resize configuration may also be obtained from the display request or other information source. If the page resize configuration is known, illustrated block 56 determines the impact of the page resize configuration on the display and/or processing of the requested data. Additionally, a determination may be made at block 58 as to the number of child nodes (e.g., child node count) and its impact on the display and/or processing of the requested data, wherein block 60 may generate a display response (e.g., determine a graphical representation of the parent node and child nodes) based on the impact of the plurality of factors. For example, a relatively large number of child nodes, combined with a significant impact of one or more of the other factors might trigger a repackaging of the default structure of the hierarchical tree. The order of execution of the illustrated blocks may vary from the order shown. For example, the determination of the child node count at block 58 might be performed prior to checking the other factors.

In one example, repackaging the default structure involves generating a plurality of subgroup placeholders and organizing the child nodes into the subgroup placeholders. Repackaging the default structure may also involve automatically minimizing one or more other nodes in the hierarchical tree to accommodate the display of the graphical representation of the parent node and the child nodes. Illustrated block 62 provides for sending the display response to the browser.

Figure 5:
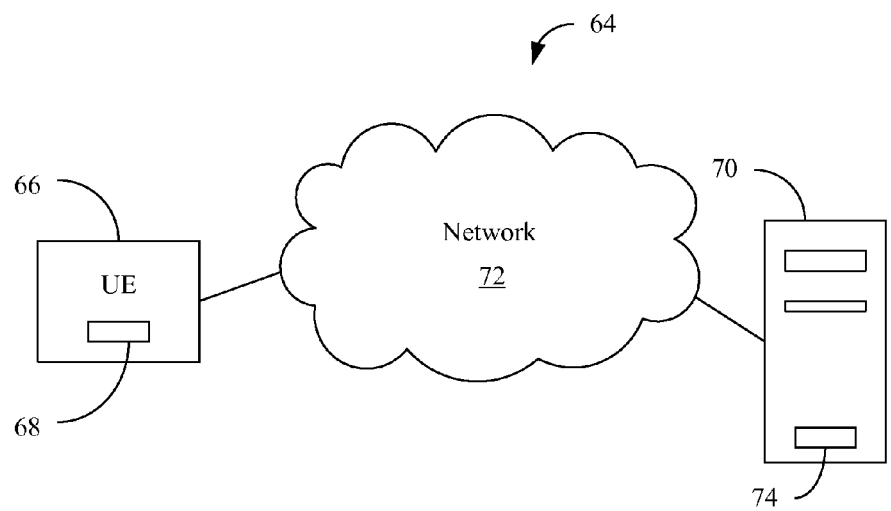
FIG. 5 is a block diagram of an example of a networking architecture according to an embodiment.

FIG. 5 shows a networking architecture 64 in which a user equipment (UE) device 66 includes browser 68 that is configured to issue display requests to a web server 70 via a network 72. In the illustrated example, the server 70 can have stored thereon hypertext markup language (HTML) and other markup language-encoded content that reflects a hierarchical tree having one or more parent nodes with a plurality of child nodes. The illustrated server 70 also includes repackaging logic 74 such as the repackaging logic 18 (FIG. 1). Thus, the repackaging logic 74 may be configured to receive the display requests, determine graphical representations of requested parent nodes and their corresponding child nodes based on a plurality of factors, and generate display responses based on the graphical representations. The plurality of factors may include, for example, browser type, available memory of the UE device 66, render latency of previously displayed nodes, client device type, display resolution, display area, page resize configuration, number of child nodes, and so forth. The network 72 can itself include any suitable combination of servers, access points, routers, base stations, mobile switching centers, public switching telephone network (PSTN) components, etc., to facilitate communication between the UE device 66 and the server 70.

Techniques described herein may therefore enable a large tree to be bundled into ranges based on the size of the tree, the resolution of the user's computer, the display area allotted to the tree, the type of browser, how long it is taking to render each level of the tree, and so forth. As a result, relatively large and flat trees may be presented in a visually appealing and manageable way, even in web based settings in which considerable variability may exist between browser and/or client device configurations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
receiving a display request from a browser, wherein the display request is associated with a parent node of a hierarchical tree and the parent node has a plurality of child nodes;
repackaging a default structure of the hierarchical tree based on a plurality of factors to determine a graphical representation of the parent node and the plurality of child nodes, wherein the plurality of factors include a render latency associated with a previously displayed node of the hierarchical tree and one or more of a browser type associated with the browser, an available memory of a client device associated with the display request, a client device type, a display resolution, a display area, a page resize configuration and a number of child nodes;
generating a display response based on the graphical representation; and
sending the display response to the browser.

2. The method of claim 1, further including:
generating a plurality of subgroup placeholders; and
organizing the plurality of child nodes into the plurality of subgroup placeholders to repackage the default structure of the hierarchical tree.

3. The method of claim 1, wherein the display request corresponds to a bookmark selection.

4. The method of claim 3, wherein one or more of the child nodes have a variable position within the default structure.

5. The method of claim 1, further including automatically minimizing one or more other nodes in the hierarchical tree to accommodate a display of the graphical representation of the parent node and the plurality of child nodes.

6. A computer program product comprising:
a computer readable storage medium; and
computer usable code stored on the computer readable storage medium, where, when executed by a processor, the computer usable code causes a computer to:
receive a display request from a browser, wherein the display request is to be associated with a parent node of a hierarchical tree and the parent node is to have a plurality of child nodes;
repackage a default structure of the hierarchical tree based on a plurality of factors to determine a graphical representation of the parent node and the plurality of child nodes, wherein the plurality of factors are to include a render latency associated with a previously displayed node of the hierarchical tree and one or more of a browser type associated with the browser, an available memory of a client device associated with the display request, a client device type, a display resolution, a display area, a page resize configuration and a number of child nodes;
generate a display response based on the graphical representation; and
send the display response to the browser.

7. The computer program product of claim 6, wherein the computer usable code, when executed, causes a computer to:
generate a plurality of subgroup placeholders; and
organize the plurality of child nodes into the plurality of subgroup placeholders to repackage the default structure of the hierarchical tree.

8. The computer program product of claim 6, wherein the display request is to correspond to a bookmark selection.

9. The computer program product of claim 8, wherein one or more of the child nodes are to have a variable position within the default structure.

10. The computer program product of claim 6, wherein the computer usable code, when executed, causes a computer to automatically minimize one or more other nodes in the hierarchical tree to accommodate a display of the graphical representation of the parent node and the plurality of child nodes.

11. A computer program product comprising:
a computer readable storage medium; and
computer usable code stored on the computer readable storage medium, where, when executed by a processor, the computer usable code causes a computer to:
receive a display request associated with a parent node of a hierarchical tree, wherein the parent node is to have a plurality of child nodes;
determine a graphical representation of the parent node and the plurality of child nodes based on a plurality of factors including a render latency associated with a previously displayed node of the hierarchical tree; and
generate a display response based on the graphical representation.

12. The computer program product of claim 11, wherein the display request is to be received from a browser and wherein the computer usable code, when executed, causes a computer to send the display response to the browser.

13. The computer program product of claim 12, wherein the plurality of factors are to include a browser type associated with the browser.

14. The computer program product of claim 11, wherein the plurality of factors are to include one or more of an available memory of a client device associated with the display request.

15. The computer program product of claim 14, wherein the plurality of factors are to further include one or more of a client device type, a display resolution, a display area, a page resize configuration and a number of child nodes.

16. The computer program product of claim 11, wherein the computer usable code, when executed, causes a computer to repackage a default structure of the hierarchical tree to determine the graphical representation.

17. The computer program product of claim 12, wherein the computer usable code, when executed, causes a computer to:
generate a plurality of subgroup placeholders; and
organize the plurality of child nodes into the plurality of subgroup placeholders to repackage the default structure of the hierarchical tree.

18. The computer program product of claim 11, wherein the display request is to correspond to a bookmark selection.

19. The computer program product of claim 18, wherein one or more of the child nodes are to have a variable position within the default structure.

20. The computer program product of claim 11, wherein the computer usable code, when executed, causes a computer to automatically minimize one or more other nodes in the hierarchical tree to accommodate a display of the graphical representation of the parent node and the plurality of child nodes.

* * * * *